Patented Aug. 3, 1943

2,325,980

UNITED STATES PATENT OFFICE 2,325,980

SOFTENER FOR COPOLYMERS OF BUTADIENE AND ACRYLONITRILE

Donald V. Sarbach, Cuyahoga Falls, Ohio, assignor to The B. F. Goodrich Company, New York, N. Y., a corporation of New York No Drawing. Application August 26, 1941, Serial No. 408,348

5 Claims. (Cl. 260—36)

This invention relates to a new softener for copolymers of butadiene hydrocarbons and alpha methylene nitriles and to the improved compositions obtainable by the use of this softener.

The softening of synthetic rubber has in general presented problems not encountered in the softening of natural rubber due to differences in behavior on roll mills, incompatibility of synthetic rubber with certain softening agents commonly employed in natural rubber and other differences in properties. It has been particularly difficult to find satisfactory softeners for the processing of the oil-resisting synthetic rubbers prepared by the copolymerization of a butadiene hydrocarbon and an alpha methylene nitrile. The problem is further complicated by the fact that some softeners for copolymers prepared from these monomers in one ratio are not satisfactory materials for use with copolymers of a different composition. For example, the 55:45 emulsion copolymer of butadiene and acrylonitrile by which is meant the synthetic rubber prepared by copolymerizing in aqueous emulsion about 55 parts by weight of butadiene and about 45 parts by weight of acrylonitrile, is not satisfactorily softened by some of the most useful softeners for emulsion copolymers prepared from butadiene and acrylonitrile in other proportions.

I have discovered the di-1-methylheptyl phthalate is an excellent softener for copolymers of butadiene-1,3 hydrocarbons and alpha methylene nitriles and that this material imparts to this type synthetic rubber certain desirable properties which do not accompany the use of softeners in general or even of other di-esters of phthalic acid. The improvement in properties brought about by the use of this softener will be apparent from the following specific example:

50 parts by weight of di-1-methyheptyl phthalate are incorporated in 100 parts by weight of a synthetic rubber made by the copolymerization in aqueous emulsion of 55 parts of butadiene and 45 parts of acrylonitrile. An extremely soft plastic stock having a Goodrich plasticity with a 10 lb. weight at 100° C. of 79.6 is obtained. When equal amounts of di-butyl phthalate, di-amyl phthalate, and di-2-ethyl hexyl phthalate are similarly incorporated into equal parts of the same synthetic rubber, comparative plasticities of only 16.4, 43.8 and 55.3 respectively are obtained.

The above composition containing di-1-methylheptyl phthalate as the softener is mixed with the usual compounding and vulcanizing ingredients including carbon black, sulfur and a vulcanization accelerator, and is then cured. The vulcanized stock possesses a good tensile strength and elongation and also exhibits a low durometer hardness which renders it particularly useful in specialized applications such as in the manufacture of printing rolls. Both the vulcanizate and the unvulcanized composition are extremely useful at low temperatures since they retain their softness and flexibility at temperatures 30° to 40° C. lower than the temperatures at which stocks containing 55:45 emulsion copolymers of butadiene and acrylonitrile ordinarily stiffen.

Although especially good results are obtained by incorporating di-1-methylheptyl phthalate in the synthetic rubber prepared by copolymerizing in aqueous emulsion about 55 parts by weight of butadiene and about 45 parts by weight of acrylonitrile, great improvements in properties are also brought about by using this softener with other synthetic rubbers prepared by copolymerizing butadiene and acrylonitrile in other proportions such as 75 parts butadiene and 25 parts acrylonitrile and 67 parts butadiene and 33 parts acrylonitrile as well as other synthetic rubbers prepared from one or more butadiene-1,3 hydrocarbons such as butadiene isoprene, 2-3 dimethyl butadiene-1,3, piperylene and the like and one or more other alpha methylene nitriles of the formula

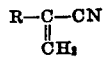

where R is an alkyl group such as methyl, ethyl, propyl or butyl.

Di-1-methylheptyl phthalate is compatible with copolymers of butadiene hydrocarbons and alpha methylene nitriles in a wide range or proportions. Equal parts of softener and copolymer may be employed if desired, but in ordinary commercial operations only about 10–50 parts of the softener for each 100 parts of the copolymer are used.

The di-1-methylheptyl phthalate may be incorporated into the copolymer by any desired method as by adding the softener while the rubber is being worked on a roll mill, masticating the mixture of rubber and softener in an internal mixer or adding the softener to a solution or dispersion of the synthetic rubber.

Other materials such as natural rubber, other softeners, pigments, fillers, vulcanizing agents, accelerators, antioxidants and the like may be included in the compositions herein described. Other modifications which will be apparent to those skilled in the art are also within the spirit and scope of the invention as defined in the appended claims.

I claim:

1. A composition of matter comprising a synthetic rubber prepared by copolymerizing a butadiene-1,3 hydrocarbon and an alpha methylene nitrile of the formula $$R-\underset{\underset{CH_3}{|}}{C}-CN$$

wherein R is a member of the class consisting of hydrogen and alkyl and, as a softener therefor, di-1-methylheptyl phthalate.

2. A composition of matter comprising di-1-methylheptyl phthalate and a rubbery copolymer of butadiene-1,3 and acrylonitrile.

3. A composition of matter comprising di-1-methylheptyl phthalate and a copolymer prepared by copolymerizing in aqueous emulsion about 55 parts of butadiene-1,3 and 45 parts of acrylonitrile.

4. Vulcanized synthetic rubber obtained by vulcanizing in the presence of di-1-methylheptyl phthalate a synthetic rubber prepared by copolymerizing a butadiene-1,3 hydrocarbon and an alpha methylene nitrile of the formula $$R-\underset{\underset{CH_3}{|}}{C}-CN$$

wherein R is a member of the class consisting of hydrogen and alkyl.

5. Vulcanized synthetic rubber obtained by vulcanizing in the presence of di-1-methylheptyl phthalate, a rubbery copolymer of butadiene-1,3 and acrylonitrile.

DONALD V. SARBACH.